(No Model.)
J. C. PATTERSON.
TWINE HOLDER.
No. 415,218. Patented Nov. 19, 1889.
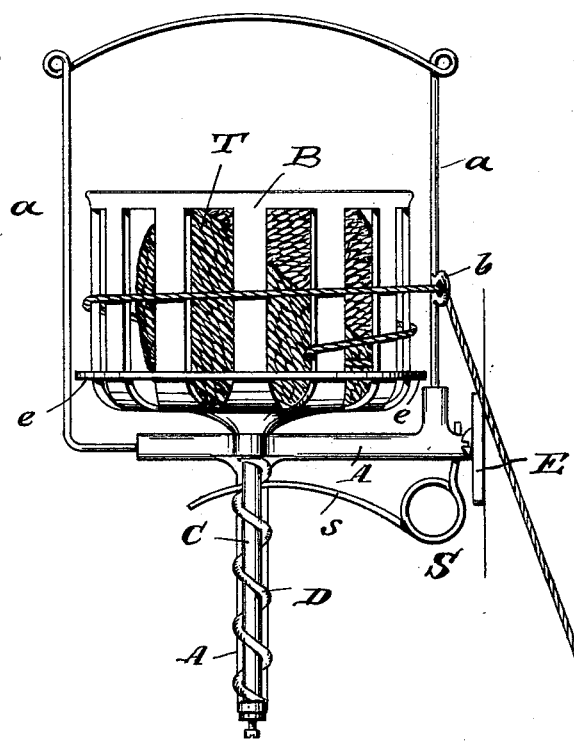
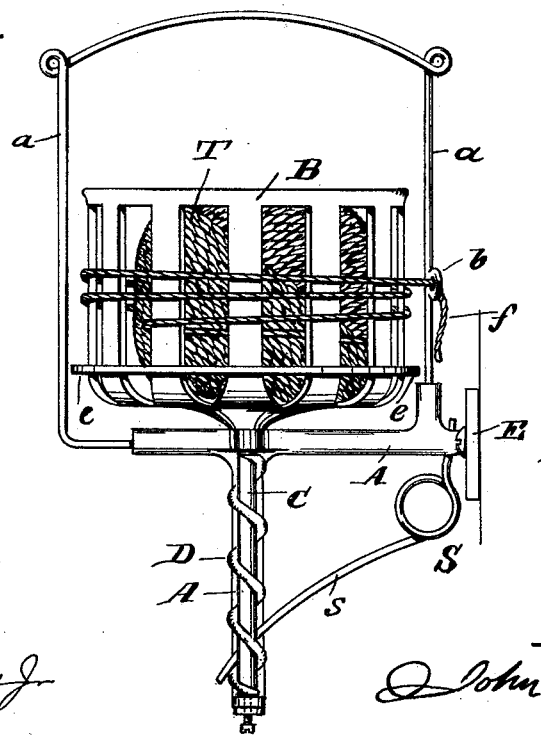
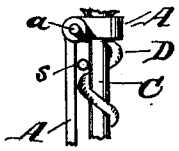
Attest
John Kirby Jr
E. R. Kirby
Inventor
John C Patterson

UNITED STATES PATENT OFFICE.

JOHN C. PATTERSON, OF DAYTON, OHIO, ASSIGNOR OF ONE-HALF TO JOHN KIRBY, JR., OF SAME PLACE.

TWINE-HOLDER.

SPECIFICATION forming part of Letters Patent No. 415,218, dated November 19, 1889.

Application filed June 10, 1889. Serial No. 313,767. (No model.)

*To all whom it may concern:*

Be it known that I, JOHN C. PATTERSON, a citizen of the United States, residing at Dayton, in the county of Montgomery and State of Ohio, have invented a certain new and useful Improvement in Twine-Holders, of which the following is a full, clear, and exact description, reference being had to the accompanying drawings, forming part of this specification.

My invention relates to receptacles for holding twine for use in tying packages and the like, and has for its object a simple and effective means for winding up for future use the surplus and unused twine which may have been unwound from the ball when in use.

In the drawings, Figure 1 is a side elevation of the holder as in use, showing the twine drawn out. Fig. 2 is a side view with surplus twine wound up after the desired quantity has been cut off. Fig. 3 is a portion of the revolving device, showing how the spring-arm is kept in contact with the spiral coil.

Like letters of reference indicate identical parts.

A is a T-shaped frame-work which supports the twine-receptacle, and has connected with it the wire frame a, which serves as a frame or cover for the twine-cage, and to which tablets for ornament or advertising purposes may be suspended. Attached to one of the arms or cast solid with it is a plate E, provided with screw-holes, so that the holder can be conveniently attached to the wall or other support for use.

The twine cage or receptacle B is made circular in shape and of any convenient size to receive the ball of twine intended to be used, and has rigidly attached to the center of its base the circular rod C. This rod extends down through the frame A in front of and parallel with the upright portion of the frame, and rests upon the lower portion of the frame, which is turned at right angles to the upright portion, in order to form a ledge for the support of the rod and cage, the cage and its connected rod thus being free to revolve in the frame A. Rigidly attached to the rod C below the horizontal portion of the T-frame is the spiral coil D. Attached to the end of one of the arms of the frame is a spring S, having a long arm s, which rests and bears upon the spiral coil and is held in contact therewith by the vertical portion of the frame A or by any convenient guide. Around the twine-cage is a ledge or shelf e, upon which the twine passing around the cage may fall or rest should it become loose. On the frame a is a loop or eyelet b, through which the twine passes, and which acts as a guide. Of course it can be on either side of the frame.

My holder is operated as follows: The ball of twine T is placed in the receptacle B and its free end passed through one of the openings in the cage, wound several times around the outside of the cage, and passed through the eyelet-hole b, and the device is then in the position shown in Fig. 2. When any portion of the twine is to be used, the free end is drawn out. This at once revolves the receptacle and its rigidly-connected rod C, and with it the spiral coil D, and the spring-arm s is raised into the position shown in Fig. 1. The desired quantity of string having been unwound and the required quantity cut off, on releasing the end of the twine the spring-arm s, acting on the spiral coil, at once revolves the receptacle in a reverse direction back to its original position and winds the surplus twine around the cage into the original position, as shown in Fig. 2.

By this simple device the twine is always ready for use, with a free end ready to be grasped, and when any desired portion has been used at once the surplus is automatically wound up around the twine-receptacle, ready for future use.

Having thus fully described my invention, what I claim, and desire to secure by Letters Patent, is—

1. In a twine-holder, the combination, with a supporting-frame, of a revolving twine-receptacle pivoted therein, a spiral coil connected with said receptacle, and a fixed spring, one end attached to said frame, the other acting on said spiral coil to re-revolve said receptacle, substantially in the manner and for the purpose described.

2. In a twine-holder, the combination of a revolving basket for holding the twine, pivoted in the frame, and forming a reel, around which the twine is wound, spiral coil D, connected with said basket-reel, and spring S, attached to the frame and having a spring-arm s, bearing upon said spiral coil, so as to revolve said reel, substantially in the manner and for the purpose described.

JOHN C. PATTERSON.

Witnesses:
JOHN KIRBY, Jr.,
E. R. KIRBY.